3,242,190
3-HYDROXY-5-AMINOMETHYLISOXAZOLE COMPOUNDS
Franz Hafliger and Andre Gagneux, Basel, and Conrad Eugster, Zurich, Switzerland, assignors to Geigy Chemical Corporation, Greenburgh, N.Y., a corporation of Delaware
No Drawing. Filed Dec. 3, 1964, Ser. No. 415,795
Claims priority, application Switzerland, Dec. 6, 1963, 14,954/63
2 Claims. (Cl. 260—307)

This invention relates to a new isoxazole derivative as well as processes for the production of this new compound which has valuable pharmacological properties. It has been found that the hitherto unknown 3-hydroxy-5-amino-methyl-isoxazole (5-aminomethyl-3-isoxazolol of Formula I

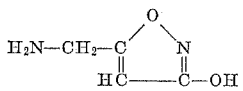

(I)

and also its acid addition salts, possess an unexpected, even in very slight dosages, inhibitory action on the central nervous system. In particular it has been found that they very strongly potentiate anaesthetics as well as reduce motility, they have catatonic and sedative effects, they inhibit the tremorine tremor and possess anti-emetic activity. These compounds are therefore useful as sedatives, calmatives and tranquilizers.

3-hydroxy-5-aminomethyl-isoxazole of Formula I is produced by hydrogenating or reducing a compound of the general Formula II

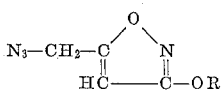

(II)

wherein R represents hydrogen or the benzyl group.

A compound of general Formula II can be hydrogenated, for example, in the presence of palladium on charcoal or of Raney nickel as catalysts, in an organic solvent such as dioxan, ethanol, methanol or tetrahydrofuran, at room temperature. In the hydrogenation, the compound of Formula I precipitates as hybrid ion and is thus, on the whole, no longer exposed to the action of hydrogen. Impurities and side products are soluble in organic solvents so that it is possible to forego the purification of the azidomethyl compound used for the hydrogenation.

Azidomethyl compounds of the general Formula II are obtained, for example, by reacting, at room temperature or slightly raised temperature, a reactive ester of 3-alkoxyl-5-hydroxymethyl-isoxazole with sodium azide in a suitable organic solvent such as acetone.

The compound of Formula I is also obtained by hydrogenolysing a compound of Formula III

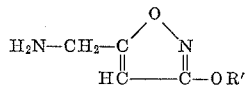

(III)

wherein R' represents the benzyl group, and if desired, converting the 3-hydroxy-5-aminomethyl-isoxazole into a salt with an inorganic or organic acid. The hydrogenolysis can be performed simultaneously, i.e. in the same step, as a hydrogenation according to the process described above.

In addition, 3-hydroxy-5-aminomethyl-isoxazole of Formula I is obtained by treating a compound of the Formula IV

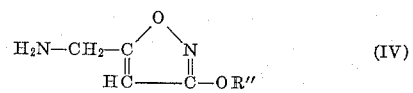

(IV)

wherein R'' represents a low alkyl radical or the benzyl group, with hydrobromic acid, hydrochloric acid or with the hydrochloride or hydrobromide of optionally alkyl-substituted pyridine, the reaction being performed while heating, e.g. at temperatures between about 100 and 150° C.

Starting compounds of Formulae III and IV wherein R' and R'' rpresent the benzyl group are obtained in the known way by, for example, heating 3-bromo-5-amino-methyl-isoxazole with benzyl alcohol for a few hours in the presence of alkali hydroxide. The compounds of Formula IV wherein R'' is a low alkyl radical are obtained in the known manner by heating a low alkanol with 3-bromo-5-aminomethyl-isoxazole in the presence of alkali hydroxide.

Another process for the production of the new isoxazole derivative of Formula I consists in reacting a reactive ester of 3-hydroxy-5-hydroxymethyl-isoxazole of Formula V

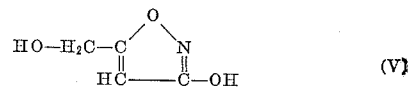

(V)

with ammonia.

The reaction is preferably performed in a closed vessel. Suitable reactive esters of compounds of Formula V are, in particular, the halides, such as chloride, bromide or iodide, and also sulphuric acid esters, e.g. esters of tolyl sulphonic acid or p-bromobenzene sulphonic acid or methylsulphonic acid.

The compound of Formula V is dissolved in a low alkanol or in water, saturated with dry ammonia in the cold and then kept for several hours at a raised temperature in a closed vessel.

A 3-hydroxy-5-halogenomethyl-isoxazole of Formula V is obtained, for example, from γ-halogen-β,β-dimethoxy-butyrohydroxamic acid, by treatment with hydrochloric acid.

Finally, the new isoxazole derivative of Formula I is obtained by hydrolysing a compound of the general Formula VI

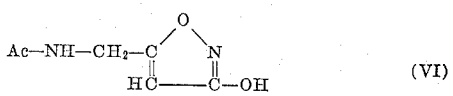

(VI)

wherein Ac is a low molecular acyl radical. The hydrolysis is preferably performed by treating the compound of general Formula VI with hydrochloric acid at boiling temperature. Examples of low molecular acyl radicals are the acetyl or benzoyl radical.

Compounds of general Formula VI are obtained, e.g. by hydrogenation of 3-benzyloxy-5-acylaminomethyl-isoxazoles with catalytically activated hydrogen at room temperature.

If desired, the new isoxazole derivative or Formula I is converted into a salt with inorganic and organic acids such as hydrochloric acid, hydrobromic acid, sulphuric acid, phosphoric acid, methane sulphonic acid, ethane disulphonic acid, β-hydroxyethane, sulphonic acid, acetic acid, lactic acid, oxalic acid, succinic acid, fumaric acid, maleic acid, malic acid, tartaric acid, citric acid, benzoic acid, salicylic acid, phenylacetic acid and mandelic acid.

In the above formulas, for instance in Formula I, and in the formulas given in the appended claims the non-ionized structure of the compounds has been given for the sake of simplicity. In fact, the compound of Formula I exists always in its zwitter ionic form, which is of the formula

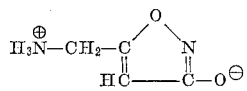

The following examples illustrate the performance of the processes according to the invention but are by no means the only methods of performing same. The temperatures are given in degrees centigrade.

*Example 1*

(a) 50 g. of the mixture of 3-chloro-5-hydroxymethyl-isoxazole (3-chloro-5-isoxazole methanol) and 3-chloro-5-[tetrahydropyran-(2')-oxymethyl]-isoxazole, and 80 g. (about 400% of the calculated amount) of potassium hydroxide are dissolved in 500 ml. of methanol and the solution is heated for 24 hours in an autoclave at 100–110°. The dark methanol solution is decanted from the precipitated salt and concentrated in vacuo. The residue and the salt are both dissolved in 400 ml. of water, the solution is made acid with concentrated hydrochloric acid and extracted with ether in a 500 ml. Kutscher-Steudel apparatus for 5 hours. The ether solution is dried over magnesium sulphate and concentrated. The residue distills at 60–90° under 0.01 Torr. Halogen test negative. NMR spectrum agrees with 3-methoxy-5-hydroxymethyl-isoxazole but shows that in addition to the 5-hydroxymethyl compound, 25% of 5-tetrahydropyranyloxymethyl compound is present.

(b) 30 g. of the mixture obtained according to (a) in 300 ml. of abs. benzene are stirred for 16 hours at 30–40° with 15 ml. of phosphorus tribromide. The reaction mixture is washed twice with 300 ml. of ice water and once with 300 ml. of saturated sodium chloride solution, dried over sodium sulphate and concentrated. The 3-methoxy-5-bromomethyl-isoxazole passes over at 102–104° on distilling under 12 Torr. Structural evidence by NMR spectrum.

(c) 19.2 g. (0.1 mol) of the above bromide dissolved in 150 ml. or acetone are added to a solution of 39 g. (0.6 mol) of sodium azide in 150 ml. of water and the whole is stirred for 12 hours at 30°. After diluting with 250 ml. of water, the mixture is extracted three times with 200 ml. of ether each time. The ether extracts are washed twice with 500 ml. of water each time, dried over magnesium sulphate and evaporated in vacuo at 30°. 3-methoxy-5-azidomethyl-isoxazole, which decomposes explosively at 200°, remains as a pale yellow liquid. The yield is quantitative. Structural evidence by NMR+IR spectrum.

(d) 5 g. (32 millimol) of the product of (c) and 10 g. (87 millimol) of pyridine hydrochloride are heated for 22 hours at 120° under an atmosphere of nitrogen. After cooling, 10 ml. of concentrated sodium hydroxide solution are added to the reaction mixture which has been dissolved in 100 ml. of water whereupon the alkaline solution is extracted twice with 200 ml. of ether each time. The organic phase is removed, washed with 300 ml. of water and 300 ml. of dilute hydrochloric acid, dried over magnesium sulphate and concentrated whereupon 15% of the starting material is regained. The aqueous phase, a dark alkaline solution, is made acid to congo paper with concentrated hydrochloric acid and extracted with ether for 6 hours in a Kutscher-Steudel apparatus. The ether solution is dried over magnesium sulphate and concentrated, the residue is dissolved in 50 ml. of abs. ether and liberated from a few undissolved flakes by treatment with active charcoal. After distilling off the ether at 30° under reduced pressure, the 3-hydroxy-5-azidomethyl-isoxazole remains in the form of pale yellow crystal which melt at 78–80°.

(e) 6.7 g. (48 millimol) of the product of (d) are dissolved in 140 ml. of abs. dioxan, 6 g. of 5% palladium charcoal are added and the whole is treated with hydrogen for 3 hours at 25° under normal pressure. The catalyst is filtered off, and the filtrate is washed with a little dioxan and slurried several times with water. The solution so obtained is evaporated, the residue is dissolved in a little water and clarified with active charcoal. The residue obtained on evaporating the clear solution is stirred for 1 hour in 50 ml. of methanol whereupon the greasy side products dissolve and the 3-hydroxy-5-aminomethyl-isoxazole remains in crystalline form. It decomposes at 155°. On careful recrystallization from water and tetrahydrofuran, white crystals are obtained which decompose at 175°.

(f) 5 ml. of 2N-hydrochloric acid in isopropanol are added to 1.5 of 3-hydroxy-5-aminomethyl-isoxazole under cooling with ice. Upon dropwise addition of methyl ethyl ketone, 3-hydroxy-5-ammoniummethyl-isoxazole chloride precipitates after several hours at 0°. The precipitate is separated by filtration and dried.

*Example 2*

(a) 600 ml. of ethanol and 600 ml. of tech. concentrated aqueous ammonia solution are mixed and the whole is saturated with ammonia at room temperature. 120.5 g. (0.5 mol) of 3-bromo-5-bromomethyl-isoxazole are added dropwise to this mixture at room temperature and the solution, which gradually becomes darker in colour, is left to stand for 24 hours. The reaction solution is then evaporated in vacuo to about 0.5 litre, and made acid with 2N hydrochloric acid. The resinous side products are removed by filtration with Hyflo and charcoal. The filtrate is washed twice with chloroform or methylene chloride and then made alkaline with concentrated sodium hydroxide solution to liberate the basic reaction product. It is then extracted five times with chloroform or methylene chloride. The combined extracts are dried over potassium carbonate and evaporated in vacuo. The liquid which remains is dissolved in ether and any greasiness or cloudiness is removed by filtration with charcoal. After evaporating off the ether, 3-bromo-5-aminomethyl-isoxazole remains as a pale brown liquid and can be reacted without any further purification.

(b) 140 g. of potassium hydroxide (2.5 mol) are dissolved in 885 ml. of methanol, 88.5 g. (0.5 mol) of crude 3-bromo-5-aminomethyl-isoxazole are added and the whole is refluxed for 20–30 hours. After cooling, potassium bromide and resinous parts are filtered off through Hyflo, the clear methanolic filtrate is evaporated and the residue is taken up in about 0.5 liters of water and extracted several times with chloroform. The combined extracts are dried over potassium carbonate and concentrated. Distillation of the residue at about 70° under 0.01 Torr. yields about 50–60% of the theoretically calculated amount of reaction product. However, according to NMR spectra, the colourless liquid also contains 20% of starting material in addition to the desired 3-methoxy-5-aminomethyl-isoxazole.

(c) 65 g. of the reaction product of (b) and 650 ml. of 24% hydrochloric acid are refluxed for 4 hours. The reaction solution is then diluted with the same volume of water and filtered with charcoal through Hyflo. The pale yellow solution is evaporated in vacuo, the residue is dried, dissolved in 650 ml. of methanol and 65 ml. of triethylamine are added. The clearly alkaline mixture is evaporated in vacuo, the residue is slurried in 650 ml. of fresh methanol, 325 ml. of tetrahydrofuran are added and the whole is cooled in a refrigerator. The 3-hydroxy-5-aminomethyl-isoxazole (5-aminomethyl-3-isoxazolol) which precipitates is washed first with methanol and then with ether.

To completely purify, the substance is dissolved in about 20 times the amount of water, methanol is added to the solution which is then filtered once or twice with charcoal through Hyflo. Tetrahydrofuran is added to the colourless filtrate at room temperature until crystallisation begins. After standing at room temperature, the substance is filtered off and, after drying for several days at 12 Torr. over phosphorus pentoxide in a desiccator it is sufficiently pure for analysis. It melts at 175° with decomposition.

Example 3

(a) 8.80 g. (50 millimol) of 3-bromo-5-aminomethyl-isoxazole, 5.6 g. (100 millimol) of potassium hydroxide and 110 ml. of benzyl alcohol are heated for 10 hours at 180°. On cooling to 20°, five times the amount of ether are added to the reaction mixture which is then extracted twice with 200 ml. of 2N hydrochloric acid each time. The acid aqueous extract is washed four times with 300 ml. of ether each time, made alkaline and then extracted three times with methylene chloride. After drying the combined methylene chloride extracts over magnesium sulphate and distilling off the solvent, a pale oil is obtained which can be identified by NMR spectrum clearly as a mixture of 95% of 3-benzyloxy-5-aminomethyl-isoxazole and 5% of benzyl alcohol.

(b) 1.02 g. (5 millimol) of 3-benzyloxy-5-aminomethyl-isoxazole in 50 ml. of abs. dioxan are hydrogenated in the presence of palladium charcoal catalyst (5%) under normal pressure and room temperature until 80% of the calculated, equimolar amount of hydrogen has been taken up. The reaction mixture is then filtered, the residue is washed with abs. dioxan and then diluted with 20 ml. of water whereupon the reaction product dissolves. After filtering off the catalyst, the aqueous solution is evaporated. The residue consists of pure 3-hydroxy-5-aminomethyl-isoxazole (5-aminomethyl-3-isoxazolol); M.P. 175° with decomposition.

Example 4

(a) 2.7 ml. of abs. methanol are saturated at 0° with dry hydrochloric acid gas, and then a mixture of 10.0 g. of γ-chloroacetoacetic acid ester, 20.0 g. of orthoformic acid methyl ester and 13 g. of abs. methanol is added. The mixture is refluxed for 4 hours while excluding water. While still hot, the reaction mixture is poured into 200 ml. of ice water while stirring, the pH is immediately adjusted to 8 with 30% sodium hydroxide solution and it is extracted four times with ether. The ether extract is dried over magnesium sulphate. After evaporating off the ether, on fractional distillation of the remaining oil through a 5 cm. Vigreux column, a main fraction is obtained which boils at between 101 and 103° under 11 Torr. and which does not react with aqueous FeCl₃ solution.

(b) A solution of 35.0 g. of hydroxylamine hydrochloride (0.5 mol) in 210 ml. of hot abs. methanol is cooled for a short time in an ice bath and, under an atmosphere of nitrogen, a solution of 42 g. of potassium hydroxide (0.75 mol) in 155 ml. of abs. methanol is so added that the temperature of the reaction solution does not rise above 20°. After all the alkali has been added, the whole is stirred in the ice bath for 5 minutes. Then the mixture is filtered under suction through a glass frit and the residue is washed with a little methanol. A solution of 35.9 g. of γ-chloro-β,β-dimethoxybutyric acid ethyl ester in 20 ml. of methanol is added to the filtrate immediately and the mixture is left to stand for 96 hours at room temperature under an atmosphere of nitrogen. A few crystals are formed after some hours (KCl). The reaction solution is evaporated in vacuo, the residue is dissolved in twice the amount of water and the solution is separated on an anion exchange column (Dowex). The column is washed neutral with water and then eluted with 2N acetic acid. Just before the acid eluate, there is a small alkaline fraction which, towards the end, becomes positive to the FeCl₃ test (wine red). The FeCl₃ positive eluate is collected an devaporated in vacuo at 40°. The pale yellow crystalline residue is evaporated five times in vacuo with water until it contains no more acetic acid whereupon it is dried for 15 hours at 40° under 0.5 Torr. The pale yellow product obtained dissolves completely in abs. methanol and melts at 107–110°.

For analysis, it is recrystallised three times from acetone, then sublimed in a bulb tube at 120° under $10^{-5}$ Torr. The white sublimate melts at 129–131° with sintering above 124°.

(c) 5.0 g. of crude γ-chloro-β,β-dimethoxy-butyrohydroxamic acid in 130 ml. of glacial acetic acid are saturated with dry HCl white stirring with a magnetic stirrer first at room temperature and then at 0°, whereupon it is left to stand for 16 hours at room temperature. The pale brown solution is evaporated at 40° in vacuo and the residue is evaporated three times with water. The yellow crystalline product so obtained is extracted twice with 130 ml. of warm ether each time, the yellow ether solution is filtered and evaporated whereupon pale yellow needles remain which melt at 90–95°

The product which is still not quite pure is unstable. It can be purified by careful recrystallisation from carbon tetrachloride or acetone or by sublimation under high vacuum (in small portions). The pure product is consideraby more stable: white needles which melt at 97–101° with sintering above about 80°; strong acid reaction in aqueous solution.

(d) 3.1 g. of crude 3-hydroxy-5-chloromethyl-isoxazole in 40 ml. of abs. methanol are saturated with dry ammonia at 0° in an autoclave fitted with an inner glass container. The autoclave is then closed and maintained for 10 hours at 100°. The dark brown reaction solution is evaporated in vacuo, the residue is taken up in water and filtered. The filtrate is separated by means of an ion exchange column (Dowex). It is eluted with water until a colourless neutral filtrate containing no chloride is obtained. The amnioisoxazolol desired all remains on the column and is eluted with 2% amomnia solution. (The eluates are tested by paper electrophoresis.) The fraction containing the aminoxazolol has an alkaline reaction (pH 8) also after complete removal of the ammonia. The aminoisoxazol can be washed with water. After evaporating the fraction containing the aminoisoxazole, yellowish crystals remain: Recrystallisation from water/methanol yields 3-hydroxy-5-aminomethyl-isoxazole M.P. 175° (with decomposition).

Example 5

(a) 6.80 g. (33 millimol) of 3-benzyloxy-5-aminomethyl-isoxazole in 19 ml. (200 millimol) of acetic acid anhydride and 100 ml. of glacial acetic acid are heated for 15 hours in a steam bath. 100 ml. of methanol are added whereupon the whole is refluxed for 1 hour and then evaporated. The residue is taken up in 100 ml. of chloroform, washed with 2N sodium bicarbonate solution, water, 2N hydrochloric acid and again with water and dried over magnesium sulphate. After evaporation, crystals are obtained which, after recrystallisation from ether/penthane melt at 73–76°.

(b) 492 mg. (2 millimol) of 3-benzyloxy-5-acetyl-aminomethyl-isoxazole in 10 ml. of 95% ethanol or glacial acetic acid are hydrogenated under normal pressure at 20° over prehydrogenated 10% Pd/charcoal. In 6 minutes 2 millimol of hydrogen are taken up. After filtering off the catalyst, on evaporating, 3-hydroxy-5-acetylaminomethyl-isoxazole is obtained, M.P. 132–135°.

(c) 312 mg. (2 millimol) of 3-hydroxy-5-acetaminomethyl-isoxazole in 20 ml. of 2N hydrochloric acid are refluxed for 2½ hours. After evaporation and drying for 2 hours over solid potassium hydroxide solution at 50° under 0.1 Torr., 3-hydroxy-5-aminomethyl-isoxazole hydrochloride is obtained, M.P. 160° (with decomposition).

What is claimed is:
1. A member selected from the group consisting of 3-hydroxy-5-aminomethyl-isoxazole and a pharmaceutically acceptable salt thereof with an acid.
2. 3-hydroxy-5-ammoniummethyl-isoxazole chloride.

No references cited.

IRVING MARCUS, *Primary Examiner.*